(12) United States Patent
Arutunoff

(10) Patent No.: US 10,434,913 B1
(45) Date of Patent: Oct. 8, 2019

(54) VEHICLE SEAT

(71) Applicant: Anatoly Arutunoff, Tulsa, OK (US)

(72) Inventor: Anatoly Arutunoff, Tulsa, OK (US)

( * ) Notice: Subject to any disclaimer, the term of this patent is extended or adjusted under 35 U.S.C. 154(b) by 0 days.

(21) Appl. No.: 16/393,578

(22) Filed: Apr. 24, 2019

Related U.S. Application Data

(60) Provisional application No. 62/662,281, filed on Apr. 25, 2018.

(51) Int. Cl.
*B60N 2/00* (2006.01)
*B60N 2/75* (2018.01)
*B60N 2/90* (2018.01)

(52) U.S. Cl.
CPC ............. *B60N 2/78* (2018.02); *B60N 2/763* (2018.02); *B60N 2/99* (2018.02)

(58) Field of Classification Search
CPC ............ B60N 2/78; B60N 2/99; B60N 2/763
See application file for complete search history.

(56) References Cited

U.S. PATENT DOCUMENTS

| 3,409,326 A | 11/1968 | Kemer | |
| 4,869,551 A * | 9/1989 | Lathers | B63B 29/04 |
| | | | 297/440.1 |
| 5,911,434 A * | 6/1999 | Townsend | B60J 5/06 |
| | | | 280/730.2 |
| 6,683,430 B2 | 1/2004 | Pavlov et al. | |
| 7,322,652 B1 | 1/2008 | Tache | |
| 8,126,615 B2 | 2/2012 | McMillen et al. | |
| 8,820,830 B2 | 9/2014 | Lich et al. | |
| 8,905,431 B1 * | 12/2014 | Line | B60R 21/215 |
| | | | 280/730.2 |
| 2001/0031055 A1 | 10/2001 | Aarts et al. | |
| 2005/0248132 A1 * | 11/2005 | Wheelwright | B60R 21/23138 |
| | | | 280/729 |
| 2006/0202452 A1 * | 9/2006 | Breed | B60R 21/214 |
| | | | 280/730.2 |
| 2008/0054702 A1 * | 3/2008 | Ali | B68G 7/05 |
| | | | 297/452.26 |
| 2008/0284143 A1 * | 11/2008 | Smith | B60R 21/207 |
| | | | 280/730.2 |
| 2010/0140990 A1 * | 6/2010 | Spahn | B60N 2/0276 |
| | | | 297/216.13 |
| 2012/0018988 A1 * | 1/2012 | Schuller | B60N 2/16 |
| | | | 280/730.2 |
| 2012/0242115 A1 * | 9/2012 | Schreiber | B60N 2/24 |
| | | | 297/180.12 |
| 2014/0001799 A1 * | 1/2014 | Kalisz | B60N 2/914 |
| | | | 297/216.1 |
| 2014/0361571 A1 * | 12/2014 | Line | B60N 2/986 |
| | | | 296/65.01 |
| 2015/0175112 A1 * | 6/2015 | Mazur | B60R 21/01554 |
| | | | 280/735 |
| 2015/0283970 A1 * | 10/2015 | Line | B60N 2/58 |
| | | | 280/728.3 |

(Continued)

FOREIGN PATENT DOCUMENTS

FR 2761310 A1 10/1998
GB 2403139 A 12/2004

*Primary Examiner* — Lori L Lyjak
(74) *Attorney, Agent, or Firm* — Chad Hinrichs

(57) ABSTRACT

A vehicle seat having at least one side bolster mounted to the vehicle door such that when the door is open the adjoining bolster moves away from the side of the seat to provide an easier path for ingress and egress from the seat.

9 Claims, 4 Drawing Sheets

(56) References Cited

U.S. PATENT DOCUMENTS

| | | | | |
|---|---|---|---|---|
| 2016/0137104 A1* | 5/2016 | Bortolon | ............... | B60N 2/62 297/284.11 |
| 2017/0166088 A1* | 6/2017 | Frye | ............... | B60N 2/0228 |
| 2019/0232839 A1* | 8/2019 | Welch | ............... | B60N 2/79 |

* cited by examiner

VEHICLE SEAT

PRIORITY CLAIM

The present application claims the priority of and is a continuation-in-part of U.S. Provisional Patent Application No. 62/662,281 titled "Automobile Seat" filed on Apr. 25, 2018. This provisional application is incorporated herein by reference.

FIELD OF THE INVENTION

The present invention relates generally to improved vehicle seat. More particularly, the present invention relates to an vehicle seat with moveable side bolster to allow greater ingress and egress to and from the seat.

BACKGROUND OF THE INVENTION

Ingress and egress from an vehicle seat can be difficult. This is especially true with high-performance vehicles. High-performance vehicles keep the driver and passenger in place by means of snug-fitting seats. Manufacturers have traditionally used seats with larger side bolsters on high performance vehicles. Bolsters provide the side walls of the seat which create a snug fit and help hold the occupant in place. However, ingress and egress considerations have traditionally limited the size of the side bolsters. Once the seatbelts and shoulder harnesses are released it is difficult to get in and out of seats with high side bolsters.

What is needed, therefore, is a seat that allows greater ingress and egress without regard for the size and shape of the seat side bolsters.

BRIEF SUMMARY OF THE INVENTION

The present invention has the advantage of allowing the car manufacture to use side bolsters that are larger than what has traditionally been used without concern about limiting the ingress and egress from the seat. This is achieved by mounting one or more of the outboard bolsters (the bolsters closest to the vehicle door) to that door. Thus, when the door is in the open position, the outboard bolsters are away from the seat. This enlarges the passageway through which the occupant moves to enter the seat. Without the outboard bolsters adjacent to the seat the occupant does not have to climb over the outboard lower bolster or around the outboard upper bolsters. Once the door is in the closed position the outboard bolsters are in place adjacent to the seat bottom and backrest and will hold the occupant firmly in place.

Other embodiments may have only one outboard bolster mounted on the door with the remaining outboard bolster(s) and the inboard bolsters are mounted to the seat or underlying frame. In this embodiment the door mounted outboard bolster moves away from the seat creating an increased passageway for the occupant to enter the seat while the remaining outboard bolster(s) and inboard bolsters stay in place adjacent to the seat bottom and backrest.

The inboard bolsters are mounted to the seat or underlying frame and do not change position with opening or closing of the door. Additional interior controls such as armrests, headrests, door handles, occupant restraints, airbags and vehicle controls remain in their normal configuration.

BRIEF DESCRIPTION OF THE DRAWINGS

Preferred embodiments of the invention will now be described in further detail. Other features, aspects, and advantages of the present invention will become better understood with regard to the following detailed description, appended claims, and accompanying drawings (which are not to scale) where:

DETAILED DESCRIPTION OF THE INVENTION

Figure 1:
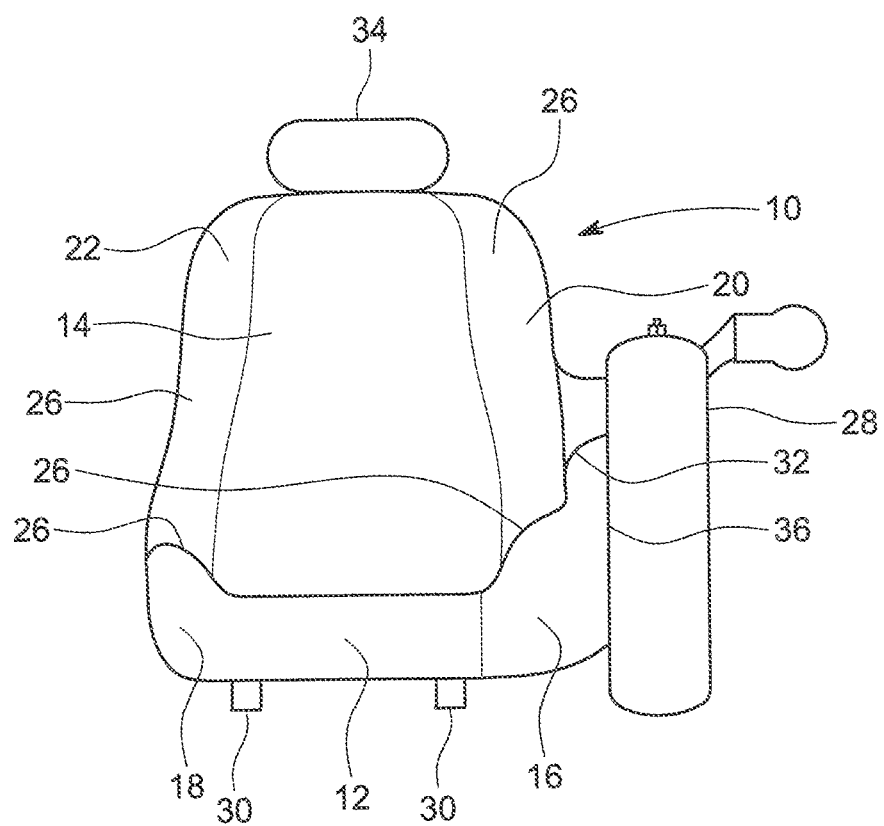
FIG. 1 is a front view of one embodiment of the present invention with the vehicle door in the closed position.
Figure 2:
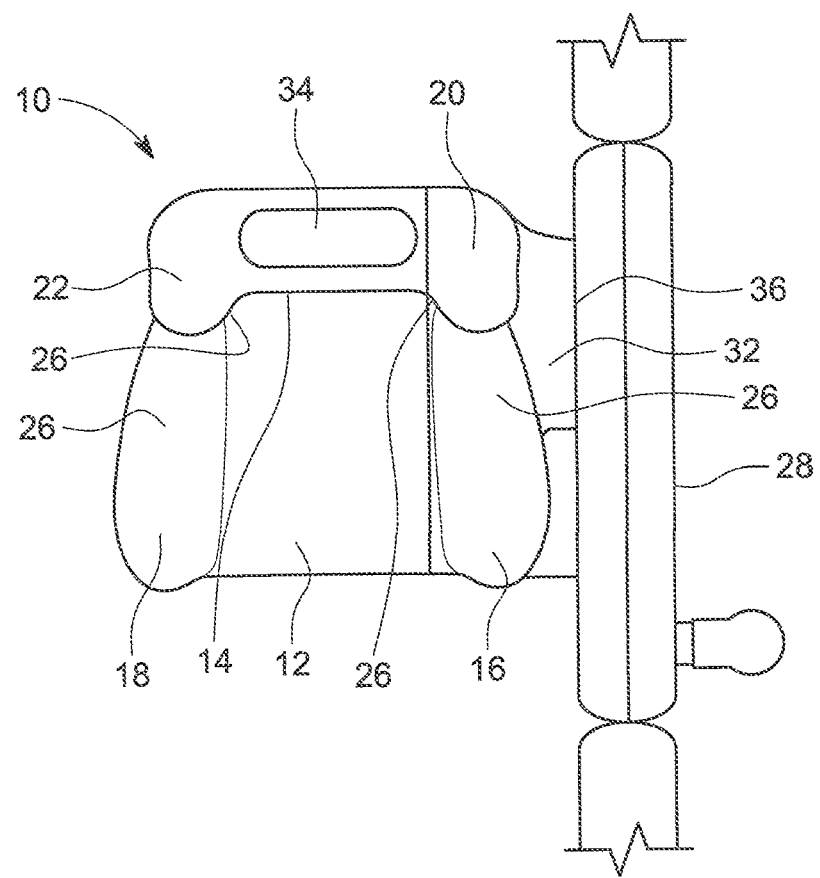
FIG. 2 is a top view of one embodiment of the present invention with the vehicle door in the closed position.
Figure 3:
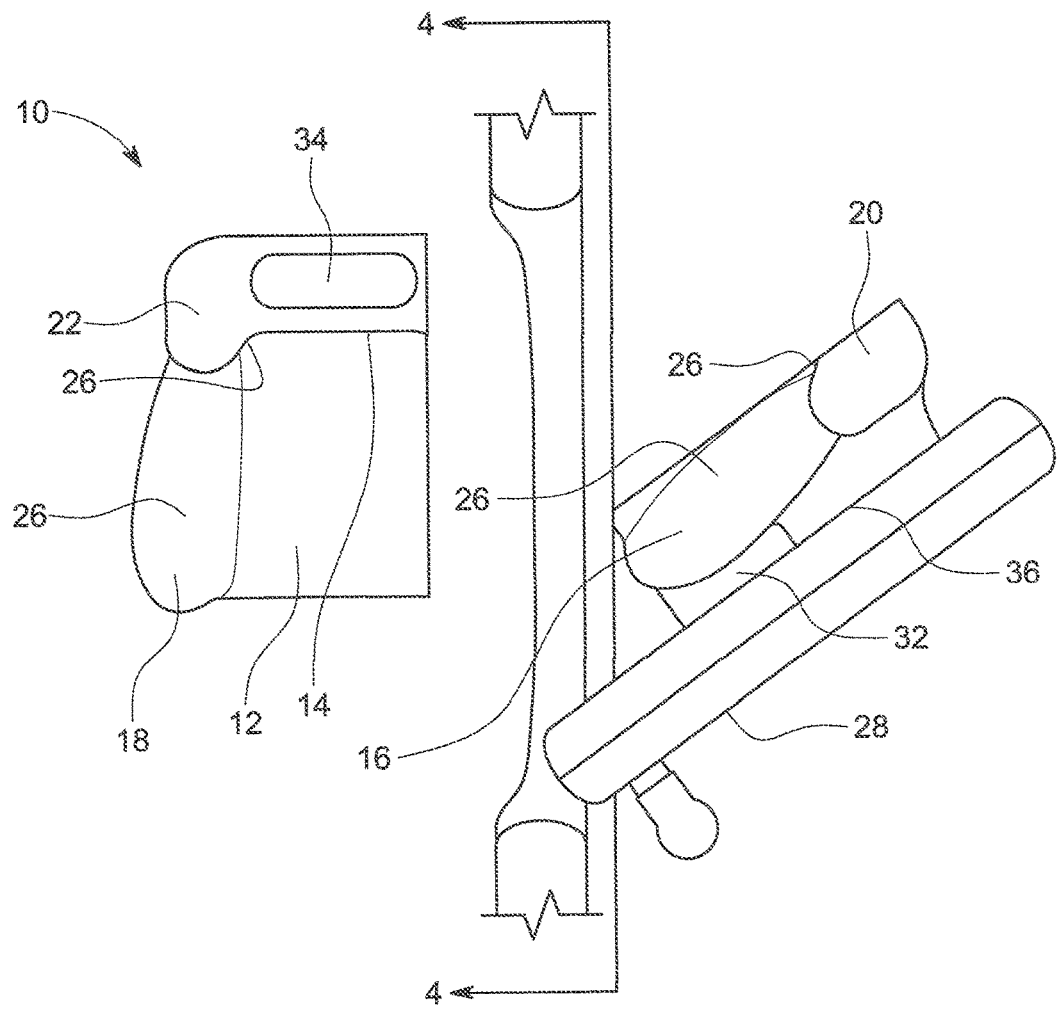
FIG. 3 is a top view of one embodiment of the present invention with the door in the open position.
Figure 4:
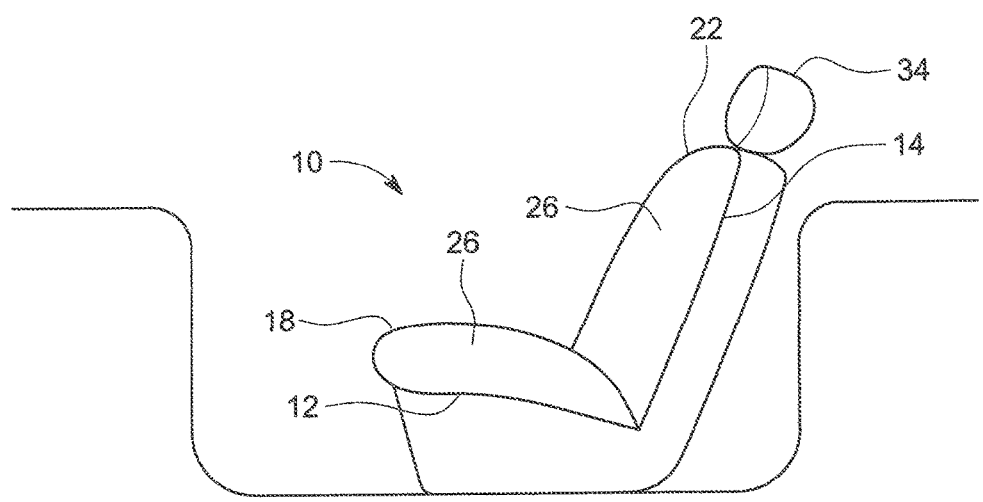
FIG. 4 is a side view of the seat of the present invention through the vehicle door opening with the side bolster and door moved out of the view.

FIGS. 1, 2, 3 and 4 show the front view (door closed), the top view (door closed) and the top view (door open), a side view without the door and side bolsters respectively, of the vehicle seat of the present invention. The seat 10 of the present invention has a bottom 12 and a backrest 14. There is a lower bolster 16 and 18 located on either side of the bottom 12. The backrest 14 has an upper bolster 20 and 22 located on either side. The bolsters 16, 18, 20 and 22 support the side of the occupant in the seat 10 and help maintain them in place in the seat 10 as the centrifugal forces of turns and curves force the occupant towards one side or the other.

The exact profile of the bolsters 16, 18, 20 and 22 can vary. They each provide a surface 26 which slopes towards the adjacent seat bottom 12 or backrest 14. This can range from a slight or gentle angle of 10 degrees relative to the seat bottom 12 or backrest 14 to a highly restrictive 80 degree angle. For reference FIG. 1 shows an angle of approximately 45 degrees between the seat bottom 12 and the surface 26 on the inboard lower bolster 18.

The bolsters closest to the door 28 through which the occupant enters are referred to as the outboard bolsters 16 and 20. The bolsters furthest from that door 28 are referred to as the inboard bolsters 18 and 22. Thus, element 16 is the outboard lower bolster. Element 18 is the inboard lower bolster. Element 20 is the outboard upper bolster. Element 22 is the inboard upper bolster.

In the preferred embodiment of the present invention the outboard bolsters 16 and 20 are mounted to the vehicle door 28. When the door 28 is in the open position the outboard side bolsters 16 and 20 are away from the seat 10. This creates a larger passageway for the occupant to enter the seat 10. Once the occupant is in the seat 10 the door 28 is closed. This puts the outboard bolsters 16 and 20 in place adjacent to the seat bottom 12 and backrest 14 respectively where they provide side support to maintain the occupant in the center of the seat 28.

While the outboard bolsters 16 and 20 of the present invention are moveable with the vehicle door 28, the inboard bolsters 18 and 22 are mounted to the seat 10 or an underlying seat frame. Thus, the inboard bolsters 18 and 22 remain stationary relative to the seat 10.

FIGS. 1 through 4 illustrate one embodiment of the present invention. It is important to note, the exact size and shape of the bolsters 16, 18, 20 and 22 can vary depending upon the exact application of the invention. Factors such as occupant size, type of vehicle, intended use, interior configuration and structural elements may impact the exact size, shape and location of the bolsters 16, 18, 20 and 22.

Other interior structures may remain in an unchanged configuration. Such structures may include, but are not limited to: armrests 32, headrest 34, door handles, occupant restraints, airbags and vehicle controls.

In certain embodiments of the present invention only one of the outboard bolsters (lower 16 or upper 20) may be mounted to the door 28. In this embodiment the other outboard bolster 18 or 20 is mounted to the seat 10 or underlying seat frame 30.

Other embodiments of the present invention may include an adjustable mounting mechanism 36 mounting the outboard bolsters 16 and 20 to the door. The adjustable mounting mechanism 36 allows movement of the outboard bolsters 16 and 20 relative to the door 28. This allows the occupant to adjust the seat 10 to fit their height and then to adjust the location of the outboard bolsters 16 and 20 to align with the backrest 14 and bottom 12 of the seat 10.

Additionally, the present invention may be used on any type of vehicle where the designer desires a tight-fitting seat while still providing ease in ingress and egress.

The foregoing description details certain preferred embodiments of the present invention and describes the best mode contemplated. It will be appreciated, however, that changes may be made in the details of construction and the configuration of components without departing from the spirit and scope of the disclosure. Therefore, the description provided herein is to be considered exemplary, rather than limiting, and the true scope of the invention is that defined by the following claims and the full range of equivalency to which each element thereof is entitled.

What is claimed is:

1. An improved vehicle seat comprising:
a seat frame,
a seat bottom,
a seat backrest,
an inboard lower bolster adjacent to the seat bottom and mounted to the seat, and
an outboard lower bolster mounted to an adjacent vehicle door,
wherein the outboard lower bolster is moveable relative to the seat bottom.

2. The seat of claim 1 further comprising:
the adjacent vehicle door having an open position and a closed position,
wherein the outboard lower bolster is adjacent to the seat bottom when the door is in the closed position and the outboard lower bolster is not adjacent to the seat bottom when the door is in the open position.

3. The seat of claim 1 further comprising:
an inboard upper bolster adjacent to the seat backrest and mounted to the seat, and
an outboard upper seat bolster mounted to an adjacent vehicle door,
wherein the outboard upper bolster is moveable relative to the bottom of the seat.

4. The seat of claim 3 further comprising:
the adjacent vehicle door having an open position and a closed position,
wherein the outboard upper bolster is adjacent to the seat backrest when the door is in the closed position and the outboard upper bolster is not adjacent to the seat bottom when the door is in the open position.

5. The seat of claim 4 further comprising:
an adjustable mounting mechanism mounting the outboard bolsters to the door,
wherein the outboard bolsters are moveable relative to the door.

6. An improved vehicle seat comprising:
a seat frame,
a seat bottom,
a seat backrest,
an inboard upper bolster adjacent to the seat backrest and mounted to the seat, and
an outboard upper bolster mounted to an adjacent vehicle door,
wherein the outboard upper bolster is moveable relative to the seat backrest.

7. The seat of claim 6 further comprising:
the adjacent vehicle door having an open position and a closed position,
wherein the outboard upper bolster is adjacent to the seat backrest when the door is in the closed position and the outboard upper bolster is not adjacent to the seat backrest when the door is in the open position.

8. The seat of claim 7 further comprising:
an adjustable mounting mechanism mounting the outboard bolsters to the door,
wherein the outboard bolsters are moveable relative to the door.

9. An improved vehicle seat comprising:
a seat frame,
a seat bottom,
a seat backrest,
an inboard lower bolster adjacent to the seat bottom and mounted to the seat frame,
an inboard upper bolster adjacent to the seat backrest and mounted to the seat frame,
an outboard lower bolster mounted to an adjacent vehicle door,
an outboard upper bolster mounted to an adjacent vehicle door, and
an adjustable mounting mechanism mounting the outboard bolsters to the adjacent vehicle door,
wherein the outboard lower bolster and outboard upper bolster are moveable relative to the seat, and the adjacent vehicle door having an open position and a closed position, and
wherein the outboard lower bolster is adjacent to the seat bottom when the door is in the closed position and the outboard lower bolster is not adjacent to the seat bottom when the door is in the open position and the outboard upper bolster is adjacent to the seat backrest when the door is in the closed position and the outboard upper bolster is not adjacent to the seat backrest when the door is in the open position.

* * * * *